(12) United States Patent
Gonzaga et al.

(10) Patent No.: US 8,905,112 B2
(45) Date of Patent: Dec. 9, 2014

(54) DEVICE FOR DEMOUNTING THE SECOND BEAD OF A TIRE FROM A RIM AND RESPECTIVE DEMOUNTING METHOD

(75) Inventors: Tullio Gonzaga, Reggio Emilia (IT); Silvano Santi, Bologna (IT)

(73) Assignee: Butler Engineering & Marketing S.p.A., Reggio Emilia (IT)

( * ) Notice: Subject to any disclaimer, the term of this patent is extended or adjusted under 35 U.S.C. 154(b) by 371 days.

(21) Appl. No.: 13/334,178

(22) Filed: Dec. 22, 2011

(65) Prior Publication Data

US 2012/0160425 A1   Jun. 28, 2012

(30) Foreign Application Priority Data

Dec. 23, 2010   (IT) .............. VR2010A0250

(51) Int. Cl.
*B60C 25/138*   (2006.01)
*B60C 25/05*   (2006.01)

(52) U.S. Cl.
CPC ........... *B60C 25/138* (2013.01); *B60C 25/0593* (2013.01)
USPC ...................................... 157/1.24

(58) Field of Classification Search
USPC ............... 157/1.17, 1.22, 1.24, 1.26, 1.28
See application file for complete search history.

(56) References Cited

U.S. PATENT DOCUMENTS

| | | | | |
|---|---|---|---|---|
| 6,629,554 B2 * | 10/2003 | Mimura | ...... | 157/1.24 |
| 6,880,606 B2 * | 4/2005 | Gonzaga | ...... | 157/1.28 |
| 7,128,119 B2 * | 10/2006 | Corghi | ...... | 157/1.22 |

FOREIGN PATENT DOCUMENTS

| | | |
|---|---|---|
| EP | 1 314 584 A1 | 5/2003 |
| EP | 1 475 252 A1 | 11/2004 |

OTHER PUBLICATIONS

European Search Report accompanied by a Statement with regard to novelty, inventive step or industrial applicability, Italian Patent Office, Jul. 20, 2011.

* cited by examiner

*Primary Examiner* — Hadi Shakeri
(74) *Attorney, Agent, or Firm* — Tutunjian & Bitetto, P.C.

(57) ABSTRACT

The present invention relates to a demounting device comprising a support member translatable along a movement axis (y-y), drive means for the support member, a tool-holder arm (3) borne by the support member (2), an abutment element (4) and a hook-like extraction member (5) both supported by the tool-holder arm (3), the abutment element (4) having a substantially flat work surface (4a), whereas the hook-like extraction member (5) is suitable for being moved in a substantially transverse direction with respect to the rotation axis (x-x) of a rim (W).

13 Claims, 7 Drawing Sheets

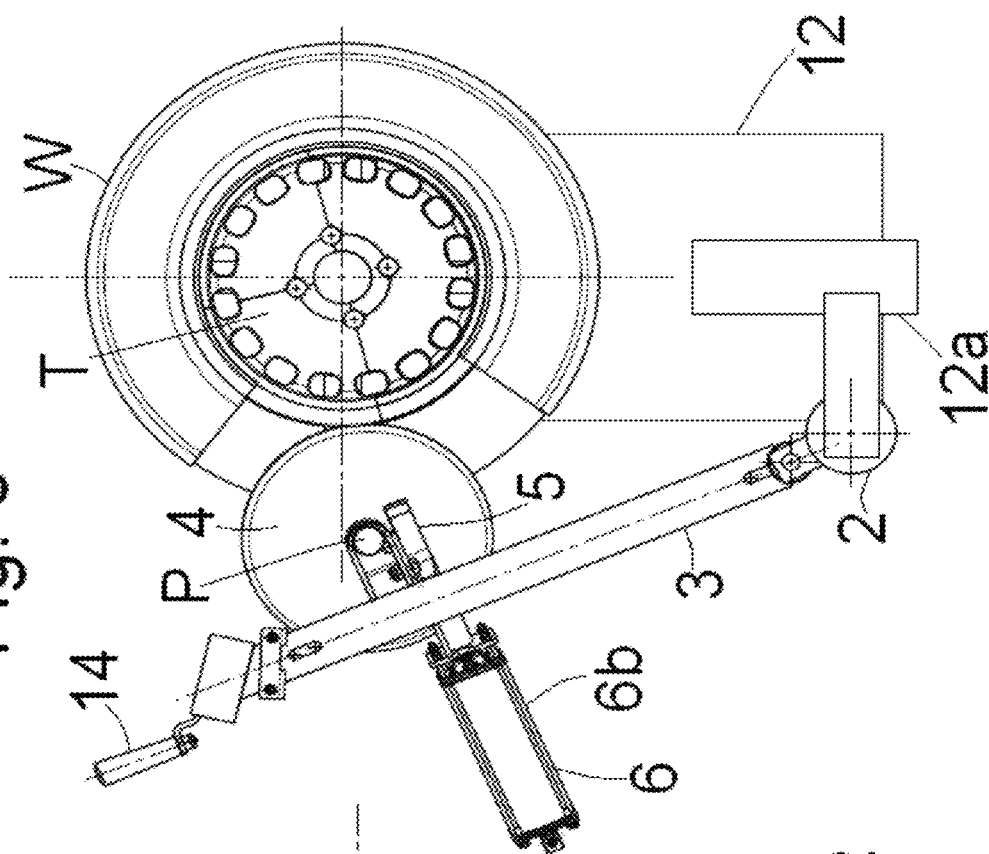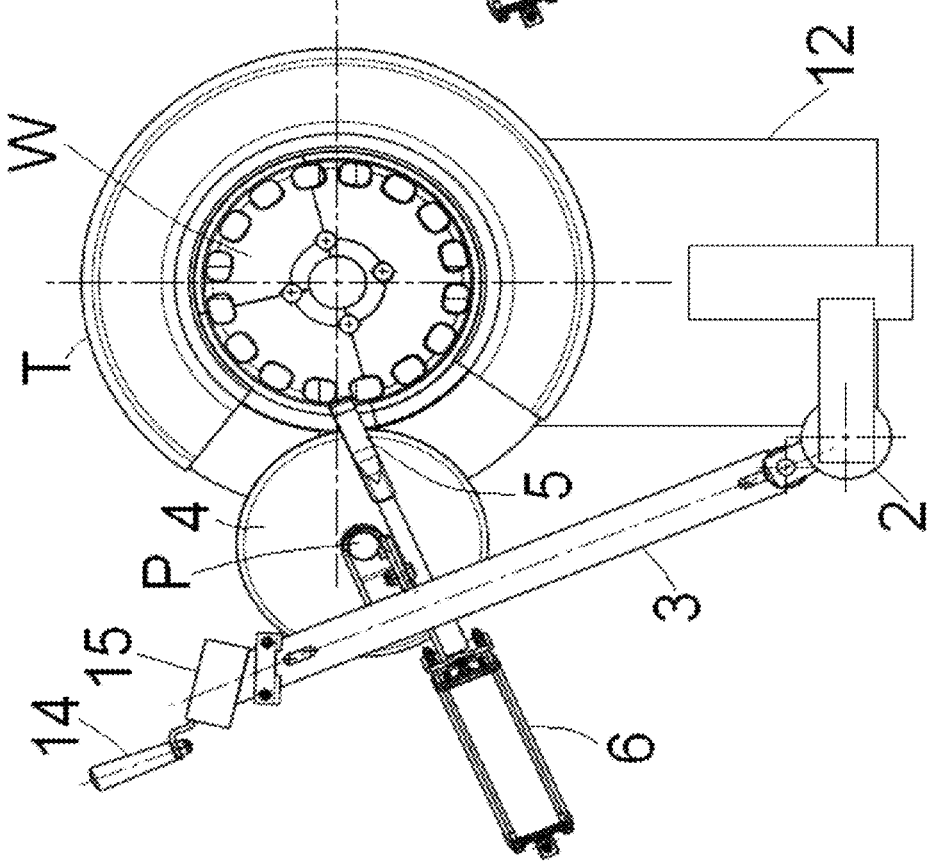

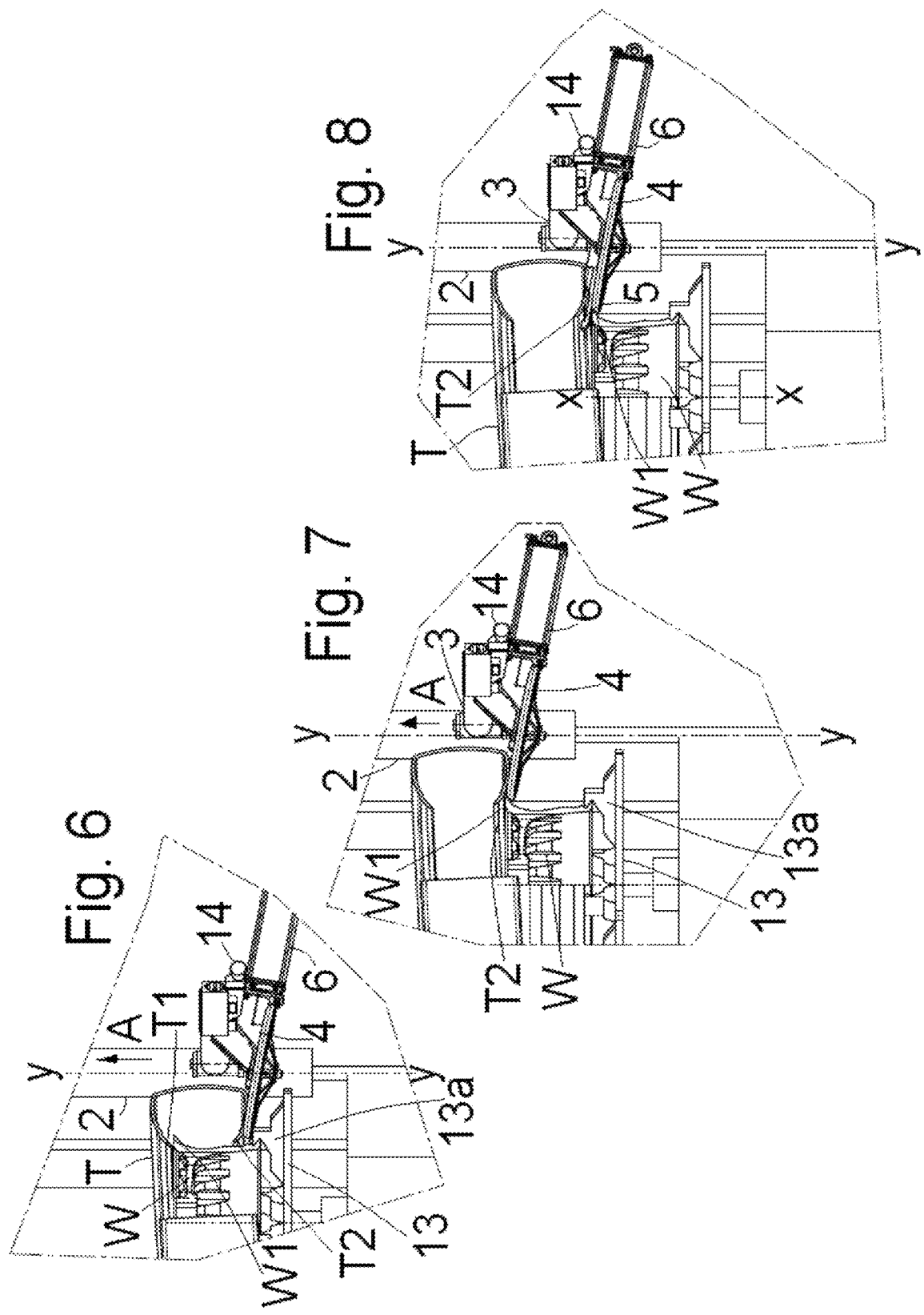

DEVICE FOR DEMOUNTING THE SECOND BEAD OF A TIRE FROM A RIM AND RESPECTIVE DEMOUNTING METHOD

FIELD OF INVENTION

The present invention regards a device for demounting the second bead of a tire from a rim, a tire mounting-demounting machine equipped with such device, as well as a new method for demounting a tire from a rim.

BACKGROUND OF INVENTION

Normally, in order to demount a tire from a rim, the bead breaking of the beads of the tire is first carried out. Then, a first bead of the tire is demounted by forcing it to be gradually brought beyond or outside the edge of the rim adjacent thereto; the rim is then turned until the first bead is completely demounted. At this point, in order to complete the demounting, it is necessary to move the second bead close to the edge of the rim (from which the first bead was demounted), bring the second bead beyond the bead itself, and then proceed in a manner analogous to that carried out for the first bead.

To perform the above, tire mounting-demounting machines have been proposed which are equipped with a rotatable disc designed to push the second bead of the tire from the outside in the direction of the rotation axis of the tire itself, the first bead of such tire having already been demounted. The second bead is pushed until it is brought to abut from the inside against the edge of the rim from which the first bead was demounted. With the rotatable disc, it is not possible to complete the demounting of the second bead by simply rotating the rim, since such disc has its rotation axis substantially parallel to the rotation axis of the rim and thus of the tire, so that during the rotation of the rim, the disc tends to move away from the rim due to the tangential force applied thereto. In order to complete the demounting of the second bead, therefore, an operator must manually intervene. This of course involves considerable physical force for the operator, with the risk of ruining the rim or the tire in case of imprecise or incorrect handling.

Demounting heads or devices have also been proposed that are capable of carrying out all the demounting operations of the second bead of a tire in an automatic manner, hence without requiring the manual intervention of the operator. The European patent EP-1 314 584 teaches a working head comprising a bead breaking roller and a curved tool which can be moved with respect to the roller by means of an actuator along a substantially curved trajectory. More particularly, the tool has a free working end and can be moved between a rest position that is retracted with respect to the roller and a work position in which its free end projects with respect to the roller.

The working head can be used for bead breaking and demounting both the first and the second bead of a tire from a respective rim. With particular reference to the demounting of the second bead, after having bead broken and demounted the first bead, i.e. after having brought it beyond the respective edge of the rim, the head is brought outside the other bead of the tire, and then brought close thereto, in a manner such that the roller is abutted against a portion of the latter bead and pushes it substantially in axial direction up to the level of the first bead of the rim.

At this point, the tool is commanded to come out, in a manner such that its free end is inserted between the free end of the roller and the first edge of the rim in a direction substantially parallel to the rim axis, and it grips a portion of the second bead of the tire. Then, in order to complete the demounting of the second bead of the tire, it is sufficient to rotate the rim.

Such solution, even if it allows demounting the tire from the respective rim in a very efficient manner, is rather complex and costly to obtain.

SUMMARY OF THE INVENTION

The main object of the present invention is to provide a device for demounting the second bead which allows demounting the bead of a tire from its respective rim in a quick and effective manner.

Another object of the present invention is to provide a demounting device which is simple and economical to obtain and protects the rim from scratches or other damage during the demounting of the second bead.

Another object of the present invention is to provide a method for demounting a tire from a rim which allows demounting in an automatic and simple manner both the first and the second bead of a tire.

According to a first aspect of the present invention, there is provided a demounting device that can be applied to a tire demounting machine for the demounting of the second bead of a tire from a rim rotatably mounted on the tire mounting-demounting machine around a rotation axis, after the first bead of the tire has already been demounted from the rim, the demounting device comprising a support member translatable along a movement axis substantially parallel to the rotation axis, drive means for the support member, a tool-holder arm borne by the support member, an abutment element and a hook-like extraction member that are both supported by the tool-holder arm, the abutment element having a substantially flat work surface, and being designed to externally abut at the work surface against the second bead and to move it via the drive means close to the first edge of the rim, the hook-like extraction member being suitable for being moved in a substantially transverse direction with respect to the rotation axis of the rim very close to the work surface between a withdrawn rest position inside the bulk of the abutment element and an extended work position in order to be inserted between the abutment element and the second bead.

According to another aspect of the present invention, a method is provided for demounting the second bead of a tire, whose first bead has already been demounted at a first edge of a rim mounted for rotation on a tire mounting-demounting machine around a rotation axis, comprising the following steps:
  providing an abutment element equipped with a substantially flat work surface, in a manner so as to make it abut against the exterior of the second bead,
  moving the abutment element in a manner so as to bring the second bead close to the first edge of the rim,
  advancing a hook-like extraction member very close to the work surface and transversely with respect to the rotation axis of the rim, so that it is inserted between the work surface and the second bead in order to engage a portion of the second bead with a free hook-like end thereof, and
  rotating the rim, while the hook-like extraction member is maintained locked in position, so as to complete the demounting of the second bead.

BRIEF DESCRIPTION OF THE DRAWINGS

Further aspects and advantages of the present invention will be clearer from the following detailed description of specific embodiments of a demounting device, such description being made with reference to the accompanying drawings, in which:

FIGS. 4 and 5 are plan views of FIG. 1 with demounting device in two different work positions;

FIGS. 6 to 8 are front elevation views with parts in section which illustrate the same number of steps of the demounting method according to the present invention.

In the accompanying drawings, equivalent or similar parts or components were marked with the same reference numerals.

DETAILED DESCRIPTION OF THE PREFERRED EMBODIMENTS

Figure 1:
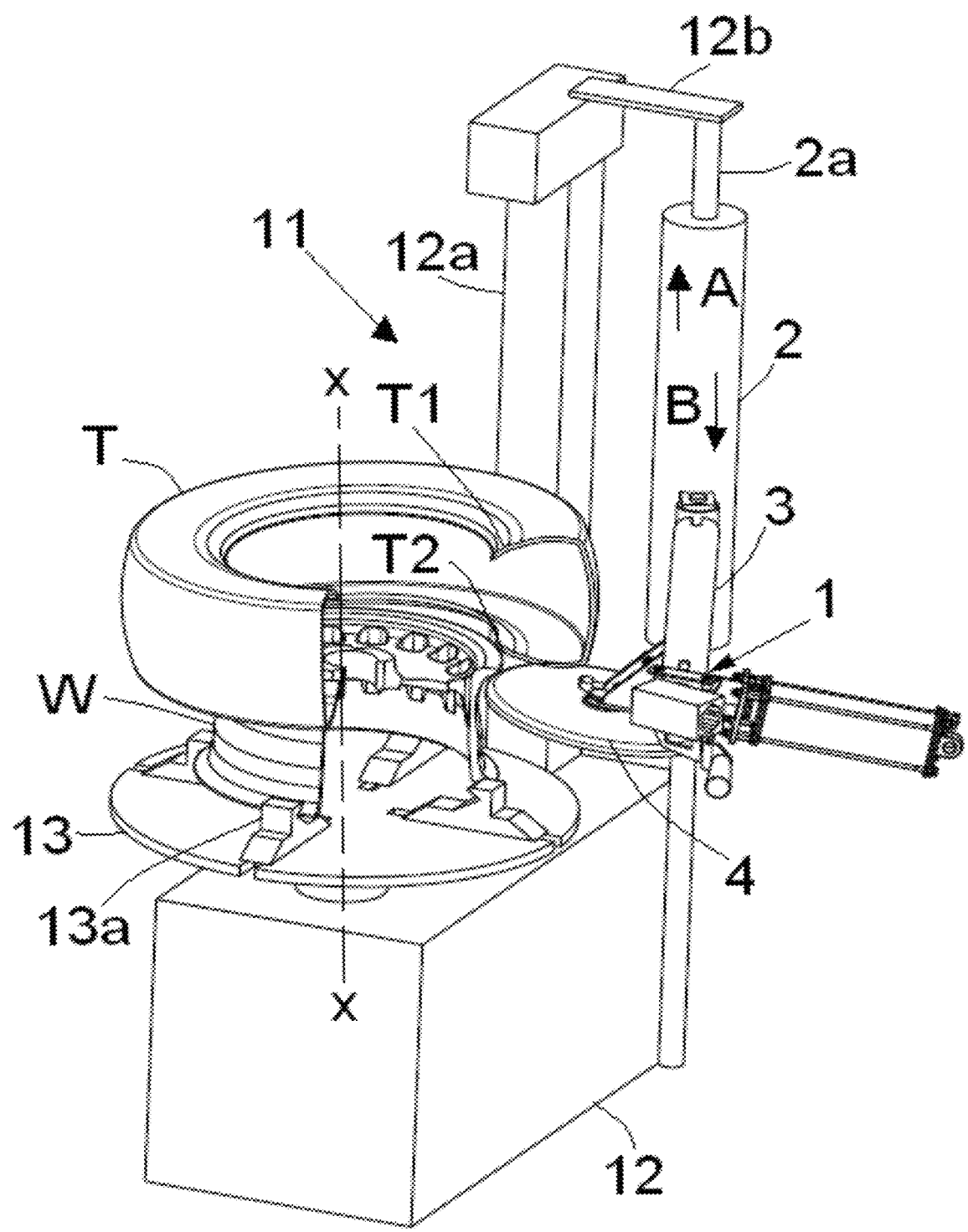
FIG. 1 is a perspective view slightly from above of a device for demounting the second bead according to the present invention mounted on a tire mounting-demounting machine.
Figure 2:
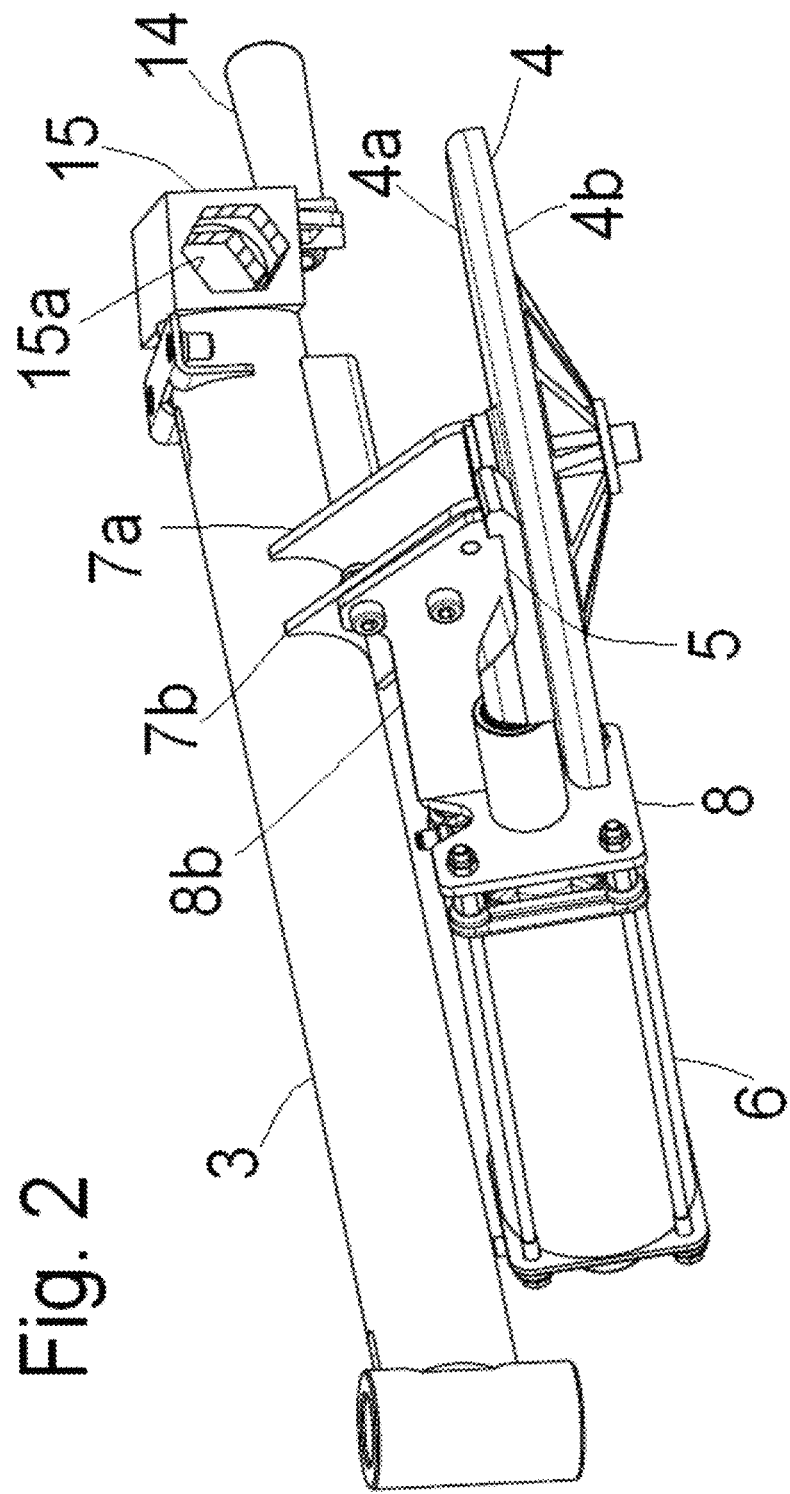
FIG. 2 is a perspective view slightly from above of a device according to the present invention.
Figure 3:
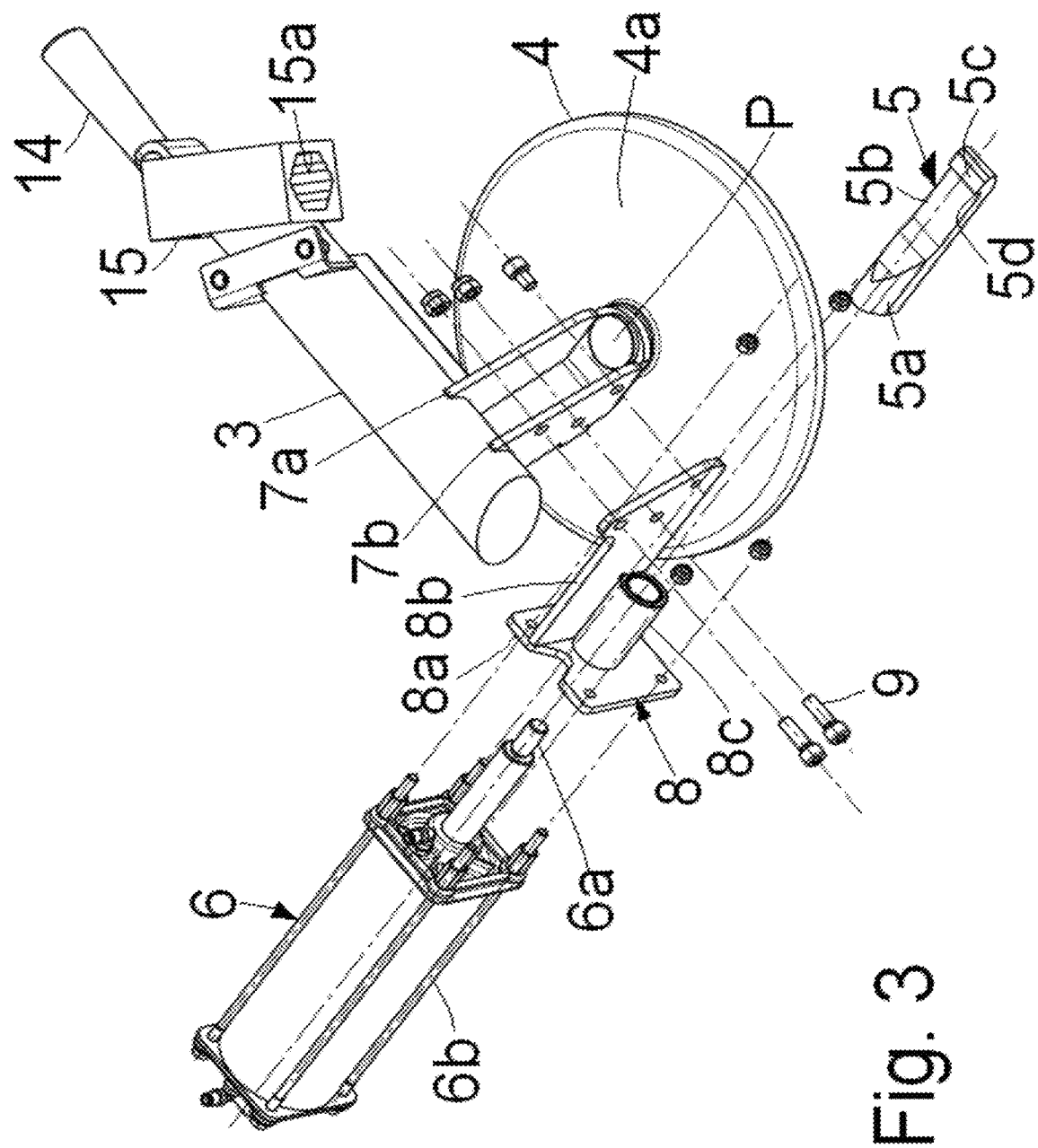
FIG. 3 is a and exploded perspective view slightly from above of the parts constituting the device of FIGS. 1 and 2.

With reference to FIGS. 1 to 8, a device 1 for demounting the second bead T2 of a tire T from a respective rim W is illustrated, which comprises a support member 2 translatable along a movement axis y-y substantially parallel to the rotation axis x-x of the rim, a tool-holder arm 3 borne by the support member 2, and also drive means for the support member 2. More particularly, the movement axis y-y of the support member 2 has two opposite and parallel directions, a thrust direction A and a removal direction B. The device then comprises a pusher element or abutment element 4, which can be configured as a disc, which is supported by the tool-holder arm 3, the pusher or abutment element 4 having a substantially flat work face or surface 4a that can be turned towards the thrust direction A. Preferably, the abutment element 4 also has a rear or back face or surface 4b turned towards the removal direction B.

Preferably, as will also be stated below, the abutment element is designed to externally abut, at the work surface 4a, against the second bead T2 and to move it close to the first edge W1 of the rim W via drive means.

According to the embodiment illustrated in the Figures, the support member comprises a vertical upright element, whereas the thrust A and removal B directions are substantially vertical, more particularly the thrust direction A is directed upward and the removal direction B is directed downward.

The device then comprises at least one hook-like extraction member or extraction lever 5, it too supported by the tool-holder arm 3 and suitable for being moved in a substantially transverse direction with respect to the rotation axis of the rim W very close to the work surface 4a between a withdrawn rest position inside the bulk of the abutment element 4 and an extended work position in order to be inserted between said abutment element 4 and the second bead T2.

In substance, the hook-like extraction member 5 is slidably mounted transverse to the thrust A and removal B directions, as well as slidably mounted very close and proximal to the work face or surface 4a and distal from the rear face or surface 4b.

Preferably, the abutment element 4 is substantially flat and mounted with position substantially transverse to the thrust A and removal B directions. Still more preferably, the disc-shaped abutment element 4 is rotatably mounted around a rotation axis that is parallel or slightly tilted with respect to the movement axis y-y.

The demounting device can then comprise an actuator 6, such as a reversible linear actuator supported by the tool-holder arm 3 and designed to drive or command the movements of the hook-like extraction member or extraction lever 5. The stem 6a of the actuator 6 can, for example, support the extraction member 5 at its head. Alternatively, different movement means for the extraction member can be provided for, such as levers or the like.

With particular reference to the embodiment illustrated in the Figures: starting from the tool-holder arm 3, a fork-like member projects which comprises a pair of brackets 7a, 7b, which support a pin P on which the abutment element 4 is rotatably mounted; such element 4, for example, has a position that is substantially orthogonal to the plane of the brackets 7a, 7b.

The actuator 6 can instead be connected to the tool-holder arm 3 by means of an anchor element 8 including, for example, a support plate or base plate 8a fixable to the head of the cylinder 6b of the actuator 6, i.e. the insertion/disconnection end of the stem 6a of the actuator 6. Starting from the base plate 8a, a plate-like projection 8b is extended that is integral with the support plate 8a and fixable to the bracket 7b of the fork-like member, e.g. by means of bolts 9, the plate-like projection 8b being substantially parallel to the bracket 7b. Also extended from the base plate 8a is a sleeve or shank 8c acting as a guide for the stem 6a of the actuator, e.g. delimiting a guide through opening for the stem 6a of the actuator 6.

The extraction lever 5 preferably has an end 5a for attaching to the movement means of the extraction member 5, i. e. the stem 6a of the actuator 6 according to the illustrated example, the attachment end being, for example, slightly enlarged and delimiting a housing seat of the tip of the stem 6a itself. The extraction member 5 then comprises a substantially rectilinear intermediate part 5b, e.g. substantially parallel to the work face 4a, as well as a hook-like, gripper free end 5c with slightly greater thickness than the intermediate part 5b so as to delimit a gripper hook or step 5d therewith, turned towards the back of the lever 5 itself, i.e. towards the attachment end 5a and far from the work face 4a of the pusher element 4.

The device 1 according to the present invention can be associated, applied or supported by a tire mounting-demounting machine 11 comprising a base 12, a wheel-holder table 13 borne by the base 12 and, for example, equipped with jaws 13a designed to clasp the rim W of a wheel to be demounted or mounted. The machine can then comprise a column 12a projected upward from the base 12.

The tool-holder arm 3 of the device 1 is substantially orthogonal to the rotation axis x-x of the rim mounted on the table 13, such that the extraction member 5 is slidably mounted in a direction substantially transverse to the rotation axis x-x of the rim W itself, between an extended work position (see FIG. 8) and a withdrawn rest position (and FIGS. 6 and 7).

According to the embodiment illustrated in the Figures, the table 13 is mounted for rotation around a substantially vertical axis, which in use corresponds to the rotation axis x-x of the rim, whereas the support member 2 of the device 1 has a substantially vertical position and is supported by the base 12 or by the column 12a.

The drive means can comprise a jack. By driving the jack, the support member 2 of the device 1 can be moved along the thrust A and removal B directions, which are substantially parallel to the rim axis x-x del rim of the wheel to be demounted. In such case, the tool-holder arm can be associated or connected with the cylinder or with the piston of the jack. According to the variant illustrated in the Figures, the support member comprises a cylinder element 2 slidably mounted on a stem 2a of a double-acting jack, while the drive means comprise means for feeding and/or suctioning the pressurized fluid from one side and/or from the other of the cylinder 2. Nevertheless, it will be understood that a different structure could be provided for in which the tool-holder arm is, for example, slidably mounted on a column element and movable along such element by means of an actuator or another drive means. The stem 2a can be supported, for example, by a bracket 12b mounted at the top of the column 12a.

The tool-holder arm 3 is also articulated to the support member 2 such that it can be angularly moved with respect thereto in a plane (horizontal in the Figures) and around a movement axis (thrust direction A and removal direction B) that is substantially parallel to the rim axis x-x, in a manner so as to move the abutment element 4 and the hook-like extraction member 5 closer to/further away from the rim W by a desired amount, when the device 1 must be used. For such purpose, a handle 14 can be provided for connected to the tool-holder arm 3, by means of which the operator can manually control the angular movement (mobility) of the tool-holder arm 3 with respect to the support member 2.

The tool-holder arm 5 can then support a block element 15 delimiting a housing seat 15a for a shank or end of a second support arm of another tool, such as a bead breaker roller.

According to the present invention, a method is also provided for demounting a tire T from a rim W rotatably mounted on a tire mounting-demounting machine around a rotation axis x-x, according to which a first bead T1 of a tire T is first demounted at a respective edge of a rim, i.e. the first bead T1 is brought beyond or outside of a respective first edge W1 of the rim W. This can be completed with a conventional method, for example.

At this point, an abutment element or pusher element 4 is arranged which is equipped with a substantially flat work surface 4a so as to make such surface abut against the exterior of the second bead T2. Then, the abutment element 4 is moved, more particularly in a substantially axial direction (parallel to the rotation axis of the rim) until the thrust portion of the second bead T2 is brought close to the first edge W1 of the rim W; preferably, during such step the thrust portion of the second bead T2 is brought partially beyond or outside the first edge W1 of the rim W but in abutment thereon. Then, a hook-like extraction member or extraction lever is commanded to advance or insert very close to the work surface and transverse to the rotation axis of the rim, so it can be inserted between the work surface and the portion of the second bead T2 in order to engage a portion of the second bead T2 with a free hook-like end thereof. In substance, during such step the extraction member 5 is moved in a direction substantially transverse to the rotation axis x-x of the rim, in a manner such that it grips the previously thrust portion of the second bead T2 and maintains it raised with respect to the first edge W1 of the rim W. In order to complete the demounting of the second bead T2, it will be sufficient to command the rotation of the rim or the device, while the hook-like extraction member 5 is maintained locked in position.

As will be understood, a demounting method according to the present invention is preferably implemented or carried out by means of a demounting device 1 described above.

With particular reference to FIGS. 6 to 8, several steps are illustrated for the demounting of the second bead T2 of a tire by means of a demounting device 1, after of course the first bead T1 has been brought beyond the respective first edge W1 of the rim W.

More particularly, illustrated in FIG. 6 is a step for thrusting—by means of abutment element or pusher 4—a portion of the second bead T2 of the tire T, from outside the tire T itself. During such step, the arm 3 is moved along the thrust direction A and the abutment element or pusher 4 moves the portion of the second bead T2 in a substantially axial direction, until it is brought partly beyond the first edge W1 of the rim W but in abutment thereon (see FIG. 7 in particular). During such step of thrusting in the thrust direction A, as will be understood, the extraction lever or member 5 is in withdrawn or rest position, hence it is distal from the tire so as to not hinder the action of the abutment element or pusher 4.

At this point, in order to complete the demounting with the conventional devices, as stated above, an operator would have to manually carry out the final demounting of the second bead.

With a device according to the present invention, however, the movement along the thrust direction A of the arm is stopped, and the sliding of the extraction member is driven (e.g. by means of the actuator 6). Such member is brought from the withdrawn or rest position (see FIGS. 6 and 7) to the extended work or grip position (see FIG. 8), by sliding transversely to the rim axis and very close to the work face 4a of the abutment element, so that it is inserted between a portion of the second bead T2 and edge W1 of the rim, gripping the portion of the second bead T2 and maintaining it raised and separated with respect to the first edge W1 of the rim W.

As stated above, at this point the rotation of the rim W or the device 1 can be commanded so as to complete the demounting of the second bead T2 and hence of the tire T.

Figure 9:
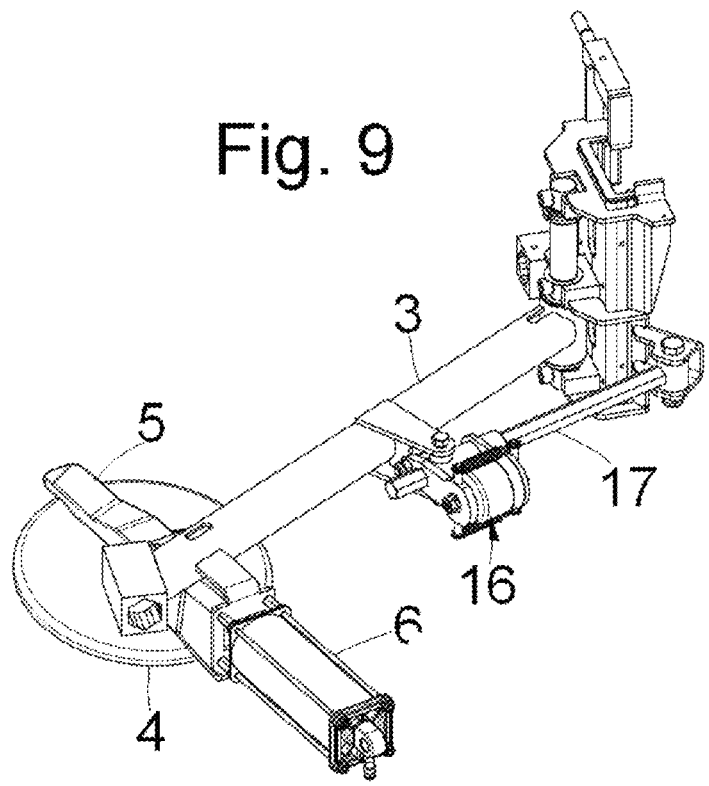
FIGS. 9 and 10 are perspective and top views, respectively, of a demounting device according to the present invention provided with a locking-unlocking means.
Figure 10:
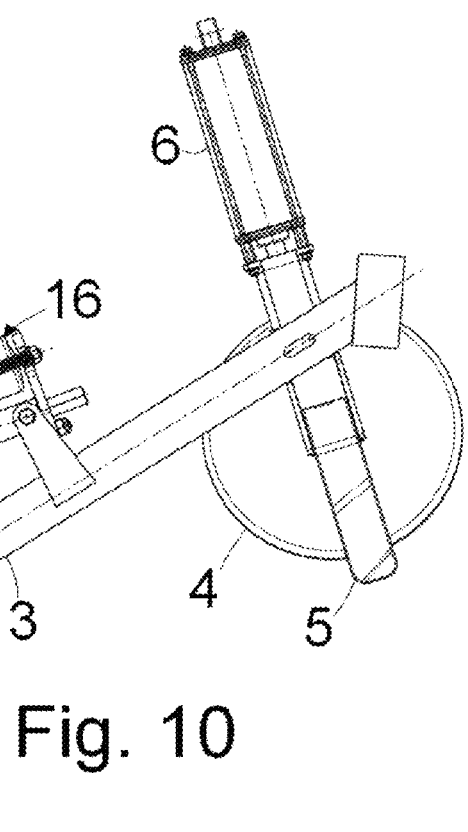
Figure 11:
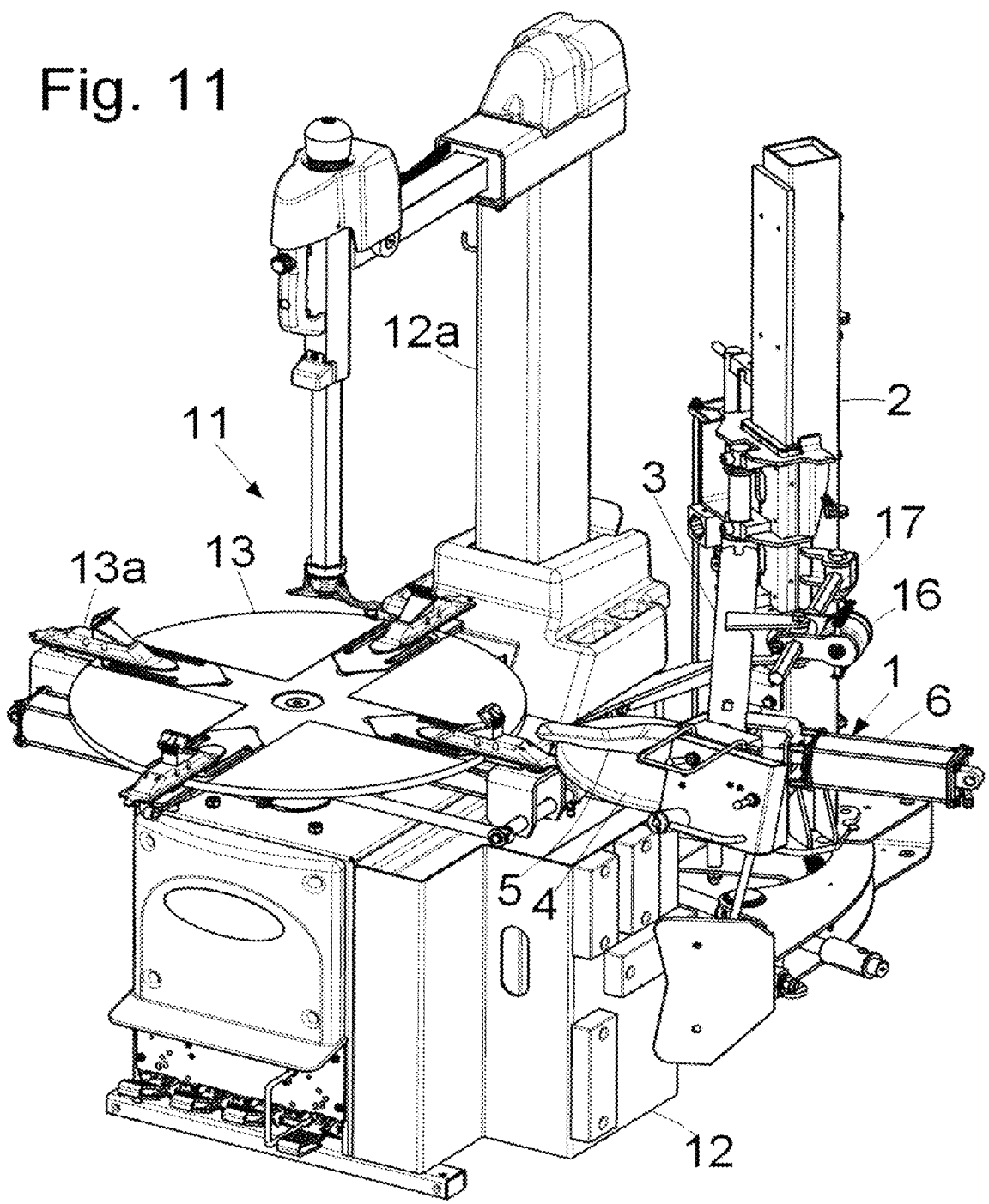
FIG. 11 is a perspective view of a tire mounting-demounting machine equipped with the locking-unlocking means of FIGS. 9 and 10.

FIGS. 9 to 11 show a variant of a device according to the present invention, which includes a locking-unlocking means 16 designed to removably block the tool-holder arm 3 against angular displacements. More particularly, the tool-holder arm 3 is pivoted to the support member 2 about an axis of rotation (vertical in the Figures), so that it is possible angularly to displace the arm 3, and in turn the abutment element 4 and the hook-like extraction member 5, with respect to the tire mounting-dismounting zone, i. e. the wheel-holder table 13 of the mounting-dismounting machine.

The locking-unlocking means 16 can include a clamp or the like designed to block the tool-holder arm 3 against angular displacement. The locking-unlocking means 16 is slidingly mounted on a rod member 17 anchored to the support member 2, and can be, for example, a pneumatically or electrically operated clamp controlled by a suitable central processing unit (not shown in the drawings).

First, the locking means 16 is deactivated, then the support member 2, and thus the demounting device 1, are angularly displaced in such a way as to bring the abutment element 4 and the hook-like extraction member 5 in work position at the demounting zone, and then the locking means 16 is actuated.

At this point, should the hook-like extraction member 5 be moved close to the work surface 4a and inserted between the work surface 4a and the second bead T2, the locking means 16 will prevent any angular displacement of the demounting device away from the work position. Upon controlling the insertion of hook-like extraction member 5, a reaction force imparted thereto by the tire to be dismounted could cause a backward angular displacement of the arm 3 away from the work position. The locking means 16 is designed to prevent such an undesirable backward movement.

It will be understood that a device according to the present invention has a much simpler structure than that of the conventional automatic devices for demounting the second bead, such as in particular that taught by EP-1 314 584, in which one must provided for a curved lever as well as a guide for such lever and a specific, complex drive system.

In addition, in a working head or device like that taught by such prior art document, the extraction lever grips a respective portion of the second bead in direction substantially parallel to the rim axis, whereas with a device or a method according to the present direction, the extraction member operates in a direction substantially transverse to the rotation axis of the rim. This ensures greater demounting effectiveness and ease, since (among other things) there is no risk that the extraction lever or member impacts against the edge of the rim from the inside.

It should also be noted that with a solution according to the present invention, it is possible to move the abutment element or pusher very close to the rim, such that it can carry out an improved thrust action on the respective portion of the second bead T2 (this is particularly requested if the pusher element is a substantially flat disc, like that taught with reference to FIGS. 1 to 8), whereas with a solution like that taught by EP-1 314 584, if the abutment element or pusher is brought close to the rim, there would be no space for the driving and insertion of the extraction lever.

In any case, the device and the method according to the present invention provide an alternative solution with respect to that taught by EP-1 314 584.

The demounting device and method described above are susceptible to numerous modifications and variations within the protection scope defined by the claims.

The invention claimed is:

1. A demounting device applicable to a tire demounting machine for demounting the second bead of a tire from a rim rotatably mounted on the tire mounting demounting machine around a rotation axis, after the first bead of said tire has already been demounted from the first edge of the rim, said device comprising a support member translatable along a movement axis that is substantially parallel to said rotation axis, means for driving said support member, a tool-holder arm borne by said support member, an abutment element and an extraction member both supported by said tool-holder arm, said abutment element having a substantially flat work surface and being designed to externally abut at said work surface against said second bead and to move it via said means for driving close to a first edge of said rim, wherein said extraction member is movable in a substantially transverse direction with respect to said rotation axis of said rim adjacent to said work surface between a withdrawn rest position inside the bulk of said abutment element and an extended work position in order to be inserted between said abutment element and said second bead.

2. A device according to claim 1, wherein said support member is slidably mounted in two opposite and parallel directions, a thrust direction and a removal direction, whereas said work surface of the abutment element is turned towards said thrust direction and a rear surface of the abutment element is turned towards said removal direction, said extraction member being slidably mounted transverse to said thrust and removal directions, as well as slidably mounted very adjacent and proximal to said work face and distal from said rear face.

3. A demounting device according to claim 1, wherein said abutment element is configured as a disc and is mounted for rotation around a rotation axis that is parallel or slightly tilted with respect to said movement axis (y-y).

4. A device according to claim 1, comprising a reversible linear actuator supported by said tool-holder arm and designed to drive said extraction member.

5. A device according to claim 4, wherein said extraction member has an end for attaching to a movement means of said extraction member, an intermediate part that is substantially rectilinear and a hook shaped, gripper free end.

6. A device according to claim 1, wherein said support member comprises a cylinder element of a double-acting jack, whereas said means for driving comprise means for feeding and/or suctioning pressurized fluid from one side and/or from the other of said cylinder.

7. A device according to claim 1, wherein said tool-holder arm is articulated to said support member, such that it can be angularly moved around the movement axis of said support member in order to move said abutment element and said extraction member close to/away from said rim.

8. A device according to claim 1, comprising bracket members projected from said tool-holder arm and supporting a pin on which said abutment element is mounted for rotation.

9. A device according to claim 8, comprising an element for anchoring an actuator to said tool-holder arm, said anchor element including a support plate fixable at the head of said actuator, a plate shaped projection integral with said support plate and securable to said bracket members, as well as a sleeve acting as a guide for a stem of said actuator.

10. A device according to claim 1, wherein said tool-holder arm is pivoted to the support arm, and said device includes a locking-unlocking means designed to removably block said tool-holder arm against angular displacement about said support arm.

11. A device according to claim 10, wherein said locking-unlocking means is pneumatically or electrically operated.

12. A tire mounting-demounting machine comprising a demounting device said device comprising a support member translatable along a movement axis that is substantially parallel to said rotation axis, means for driving said support member, a tool-holder arm borne by said support member, an abutment element and an extraction member both supported by said tool-holder arm, said abutment element having a substantially flat work surface and being designed to externally abut at said work surface against said second bead and to move it via said means for driving close to a first edge of said rim, wherein said extraction member is movable in a substantially transverse direction with respect to said rotation axis of said rim adjacent to said work surface between a withdrawn rest position inside the bulk of said abutment element and an extended work position in order to be inserted between said abutment element and said second bead and further comprising a base, a wheel-holder table borne by the base, wherein said tool-holder arm of said device is substantially orthogonal to the rotation axis of a rim mounted on said wheel-holder table, and wherein said wheel-holder table is mounted for rotation around a substantially vertical axis, and said support member of said demounting device has a substantially vertical position and is supported by said base.

13. A method for demounting the second bead of a tire, whose first bead has already been demounted at a first edge of a rim mounted for rotation on a tire mounting demounting machine around a rotation axis, comprising the following steps:

provinding a demounting device applicable to the tire demounting machine for demounting the second bead of a tire from the rim rotatably mounted on the tire mounting demounting machine around the rotation axis after the first bead of said tire has already been demounted from the first edge of the rim, said device comprising a support member translatable along a movement axis that is substantially parallel to said rotation axis, means for driving said support member, a tool-holder arm borne by said support member;

providing an abutment element equipped with a substantially flat work surface, in a manner so as to make it abut against the exterior of said second bead, moving said abutment element in a manner so as to bring said second bead close to said first edge of said rim, advancing an extraction member adjacent to the work surface and transversely with respect to said rotation axis of said rim, so that it can be inserted between said work surface and said second bead in order to engage a portion of said second bead with a hook shaped free end thereof, and rotating said rim, while said extraction member is maintained locked in position, thereby completing the demounting of said second bead.

* * * * *